(12) United States Patent
Mukku

(10) Patent No.: US 12,717,680 B2
(45) Date of Patent: Aug. 25, 2026

(54) CLUSTER SNAPSHOTS

(71) Applicant: Rakuten Symphony, Inc., Tokyo (JP)

(72) Inventor: Jagadish Mukku, Sunnyvale, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/006,783

(22) PCT Filed: Dec. 12, 2022

(86) PCT No.: PCT/US2022/052573
§ 371 (c)(1),
(2) Date: Jan. 25, 2023

(87) PCT Pub. No.: WO2024/129059
PCT Pub. Date: Jun. 20, 2024

(65) Prior Publication Data

US 2025/0291678 A1 Sep. 18, 2025

(51) Int. Cl.
*G06F 11/1446* (2026.01)
*G06F 11/20* (2006.01)

(52) U.S. Cl.
CPC ...... *G06F 11/1451* (2013.01); *G06F 11/1461* (2013.01); *G06F 11/1469* (2013.01); *G06F 11/2056* (2013.01)

(58) Field of Classification Search
CPC ............. G06F 11/1451; G06F 11/1461; G06F 11/1469; G06F 11/2056
See application file for complete search history.

(56) References Cited

U.S. PATENT DOCUMENTS 6,694,413 B1 * 2/2004 Mimatsu ............. G06F 11/1466 707/999.204
7,010,617 B2 3/2006 Kampe
7,191,304 B1 3/2007 Cameron
7,483,915 B2 1/2009 Thompson
(Continued)

FOREIGN PATENT DOCUMENTS

CN 104536971 A 4/2015
CN 104899071 A 9/2015
(Continued)

*Primary Examiner* — Ashish Thomas
*Assistant Examiner* — Indranil Chowdhury
(74) *Attorney, Agent, or Firm* — David R. Stevens; Stevens Law Group

(57) ABSTRACT

A first cluster creates a cluster exchange object including identifiers of components of the first cluster and segments of data of the first cluster along with configuration data, such as access points and credentials. The first cluster transmits the object to a second cluster that instantiates copies of the components and retrieves the segments from the first cluster to become a replica of the second cluster. The second cluster may then commence execution upon failure of the primary cluster and restore the primary cluster. The primary cluster may send snapshot objects to the second cluster to communicate changes to the primary cluster and the snapshot objects may also be used to restore the primary cluster following failure. The components of a cluster may be represented in a directory structure and data describing a component may be retrieved in response to user interactions with a representation of the directory structure.

18 Claims, 9 Drawing Sheets

(56) References Cited

U.S. PATENT DOCUMENTS 7,627,728 B1 12/2009 Roeck
7,774,568 B2 8/2010 Sudhakar
7,953,894 B2 5/2011 Hady
7,996,510 B2 8/2011 Vicente
8,386,847 B2 2/2013 Garimella
8,392,680 B1 3/2013 Natanzon
8,874,841 B2 10/2014 Patterson
8,909,602 B2 12/2014 Soundararajan
8,914,567 B2 12/2014 Miroshnichenko
9,043,567 B1 5/2015 Modukuri
9,176,829 B2 11/2015 Jain
9,870,291 B2 1/2018 Bezbaruah
10,031,917 B2 * 7/2018 Kumarasamy ........ G06F 16/128
10,320,702 B2 6/2019 Gahlot
10,700,991 B2 6/2020 Khinvasara
10,756,995 B2 8/2020 Schibler
10,868,742 B2 12/2020 Chitalia
10,909,072 B2 2/2021 Sun
10,936,444 B2 3/2021 Rhodes
11,030,055 B2 6/2021 Gupta
11,086,545 B1 * 8/2021 Dayal ..................... G06F 3/067
11,321,278 B2 5/2022 Gupta
11,469,960 B1 10/2022 Kottapalli
11,860,895 B2 1/2024 Acheson
2004/0054791 A1 3/2004 Chakraborty et al.
2006/0053139 A1 3/2006 Marzinski
2007/0013703 A1 1/2007 Tortolini
2007/0150677 A1 * 6/2007 Homma .............. G06F 11/2082 711/162
2008/0052327 A1 2/2008 Buah
2012/0136834 A1 * 5/2012 Zhao ................... G06F 11/1453 707/649
2014/0007088 A1 * 1/2014 Jamjoom ............ H04L 67/1001 718/1
2014/0047342 A1 2/2014 Breternitz et al.
2014/0195484 A1 * 7/2014 Wang .................. G06F 9/45558 707/624
2015/0066857 A1 * 3/2015 Dayal ................... G06F 16/128 707/639
2016/0034481 A1 * 2/2016 Kumarasamy ........ G06F 16/128 707/639
2016/0277249 A1 9/2016 Singh et al.
2016/0366233 A1 12/2016 Le et al.
2018/0024853 A1 1/2018 Warfield
2018/0300203 A1 * 10/2018 Kathpal .............. G06F 11/1464
2019/0065323 A1 * 2/2019 Dhamdhere ........ G06F 11/1484
2019/0163559 A1 5/2019 Takahashi
2019/0339870 A1 * 11/2019 Meiri .................. G06F 11/1464
2020/0167238 A1 * 5/2020 Killamsetti ......... G06F 11/1461
2020/0195735 A1 6/2020 Greifeneder et al.
2020/0241754 A1 * 7/2020 Bett ........................ G06F 3/067
2021/0157681 A1 * 5/2021 LeCrone ............... G06F 16/119
2022/0067061 A1 3/2022 Mankad
2022/0138047 A1 * 5/2022 Aquino ................. G06F 3/0689 711/162
2022/0179671 A1 6/2022 Seetala et al.
2023/0126234 A1 * 4/2023 Dharmaprikar ..... G06F 11/1448 707/639
2023/0128602 A1 * 4/2023 Park .................... G06F 11/1438 714/6.3
2023/0342267 A1 10/2023 Pabon
2024/0012717 A1 1/2024 Mitkar
2024/0061751 A1 2/2024 Janarthanam
2024/0103980 A1 3/2024 Kumar
2024/0143554 A1 * 5/2024 Kaushik ................ G06F 16/178

FOREIGN PATENT DOCUMENTS

CN 105224533 1/2016
CN 103365741 B 5/2016
KR 100832543 B1 5/2008
WO WO2001082078 A9 11/2001
WO WO-2024129058 A1 * 6/2024 ........... G06F 9/5077
WO WO-2024129060 A1 * 6/2024 .......... G06F 11/2048

* cited by examiner

/<Access Point ID>/<Cluster ID>/<Application ID>/<Vol. ID>/<Snapshot ID

CLUSTER SNAPSHOTS

BACKGROUND

Field of the Invention

This invention relates to performing multi-cluster recovery.

Background of the Invention

Many computing installations will deploy a plurality of application instances in a cluster, such as a KUBERNETES cluster. The cluster may be defined across one or more hosts and implement an internal network coupling one or more hosts and by which the plurality of application instances communicate with one another. A cluster may manage scaling up and scaling down of the number of application instances, monitoring the application instances, and replacing failed application instances. A cluster may also manage redundancy and failover between application instances. The application instances may execute within containers and the containers may be managed by a pod implemented on each host.

It would be an advancement in the art to extend and improve the operation of clusters in a computing environment.

SUMMARY OF THE INVENTION

An apparatus includes a computing device including a plurality of processing devices and one or more memory devices operably coupled to the one or more processing devices. The one or more memory devices store executable code that, when executed by the plurality of processing devices, causes the plurality of processing devices to create, by a first cluster executing on the computer system, a snapshot object for a first cluster including one or more identifiers of one or more components that have changed in the first cluster. The first cluster transmits the snapshot object to a second cluster executing on the computer system. In response to the snapshot object, the second cluster instantiates copies of the one or more components on the second cluster such that the second cluster becomes a replica of the first cluster.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
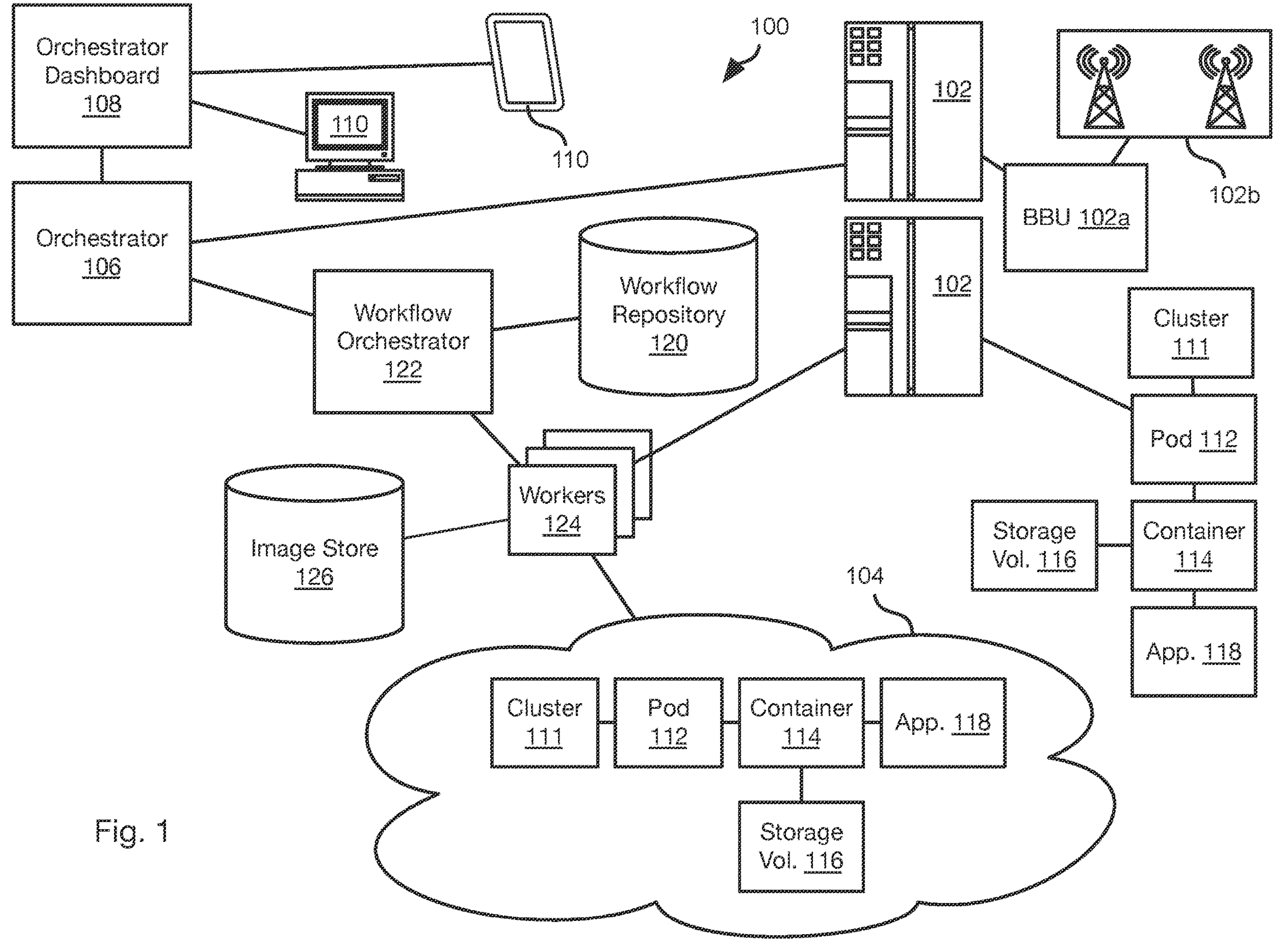
FIG. 1 is a schematic block diagram of a network environment in which a cluster may be deployed in accordance with an embodiment.

FIG. 1 illustrates an example network environment 100 in which the systems and methods disclosed herein may be used. The components of the network environment 100 may be connected to one another by a network such as a local area network (LAN), wide area network (WAN), the Internet, a backplane of a chassis, or other type of network. The components of the network environment 100 may be connected by wired or wireless network connections. The network environment 100 includes a plurality of servers 102. Each of the servers 102 may include one or more computing devices, such as a computing device having some or all of the attributes of the computing device 1100 of FIG. 11.

Computing resources may also be allocated and utilized within a cloud computing platform 104, such as amazon web services (AWS), GOOGLE CLOUD, AZURE, or other cloud computing platform. Cloud computing resources may include purchased physical storage, processor time, memory, and/or networking bandwidth in units designated by the provider by the cloud computing platform.

In some embodiments, some or all of the servers 102 may function as edge servers in a telecommunication network. For example, some or all of the servers 102 may be coupled to baseband units (BBU) 102*a* that provide translation between radio frequency signals output and received by antennas 102*b* and digital data transmitted and received by the servers 102. For example, each BBU 102*a* may perform this translation according to a cellular wireless data protocol (e.g., 4G, 5G, etc.). Servers 102 that function as edge servers may have limited computational resources or may be heavily loaded.

An orchestrator 106 provisions computing resources to application instances 118 of one or more different application executables, such as according to a manifest that defines requirements of computing resources for each application instance. The manifest may define dynamic requirements defining the scaling up or scaling down of a number of application instances 118 and corresponding computing resources in response to usage. The orchestrator 106 may include or cooperate with a utility such as KUBERNETES to perform dynamic scaling up and scaling down the number of application instances 118.

An orchestrator 106 may execute on a computer system that is distinct from the servers 102 and is connected to the servers 102 by a network that requires the use of a destination address for communication, such as using a networking including ethernet protocol, internet protocol (IP), Fibre Channel, or other protocol, including any higher-level protocols built on the previously-mentioned protocols, such as user datagram protocol (UDP), transport control protocol (TCP), or the like.

The orchestrator 106 may cooperate with the servers 102 to initialize and configure the servers 102. For example, each server 102 may cooperate with the orchestrator 106 to obtain a gateway address to use for outbound communication and a source address assigned to the server 102 for use in inbound communication. The server 102 may cooperate with the orchestrator 106 to install an operating system on the server 102. For example, the gateway address and source address may be provided and the operating system installed using the approach described in U.S. application Ser. No. 16/903,266, filed Jun. 16, 2020 and entitled AUTOMATED INITIALIZATION OF SERVERS, which is hereby incorporated herein by reference in its entirety.

The orchestrator 106 may be accessible by way of an orchestrator dashboard 108. The orchestrator dashboard 108 may be implemented as a web server or other server-side application that is accessible by way of a browser or client application executing on a user computing device 110, such as a desktop computer, laptop computer, mobile phone, tablet computer, or other computing device.

The orchestrator 106 may cooperate with the servers 102 in order to provision computing resources of the servers 102 and instantiate components of a distributed computing system on the servers 102 and/or on the cloud computing platform 104. For example, the orchestrator 106 may ingest a manifest defining the provisioning of computing resources to, and the instantiation of, components such as a cluster 111, pod 112 (e.g., KUBERNETES pod), container 114 (e.g., DOCKER container), storage volume 116, and an application instance 118. The orchestrator may then allocate computing resources and instantiate the components according to the manifest.

The manifest may define requirements such as network latency requirements, affinity requirements (same node, same chassis, same rack, same data center, same cloud region, etc.), anti-affinity requirements (different node, different chassis, different rack, different data center, different cloud region, etc.), as well as minimum provisioning requirements (number of cores, amount of memory, etc.), performance or quality of service (QOS) requirements, or other constraints. The orchestrator 106 may therefore provision computing resources in order to satisfy or approximately satisfy the requirements of the manifest.

The instantiation of components and the management of the components may be implemented by means of workflows. A workflow is a series of tasks, executables, configuration, parameters, and other computing functions that are predefined and stored in a workflow repository 120. A workflow may be defined to instantiate each type of component (cluster 111, pod 112, container 114, storage volume 116, application instance, etc.), monitor the performance of each type of component, repair each type of component, upgrade each type of component, replace each type of component, copy (snapshot, backup, etc.) and restore from a copy each type of component, and other tasks. Some or all of the tasks performed by a workflow may be implemented using KUBERNETES or other utility for performing some or all of the tasks.

The orchestrator 106 may instruct a workflow orchestrator 122 to perform a task with respect to a component. In response, the workflow orchestrator 122 retrieves the workflow from the workflow repository 120 corresponding to the task (e.g., the type of task (instantiate, monitor, upgrade, replace, copy, restore, etc.) and the type of component. The workflow orchestrator 122 then selects a worker 124 from a worker pool and instructs the worker 124 to implement the workflow with respect to a server 102 or the cloud computing platform 104. The instruction from the orchestrator 106 may specify a particular server 102, cloud region or cloud provider, or other location for performing the workflow. The worker 124, which may be a container, then implements the functions of the workflow with respect to the location instructed by the orchestrator 106. In some implementations, the worker 124 may also perform the tasks of retrieving a workflow from the workflow repository 120 as instructed by the workflow orchestrator 122. The workflow orchestrator 122 and/or the workers 124 may retrieve executable images for instantiating components from an image store 126.

Figure 2:
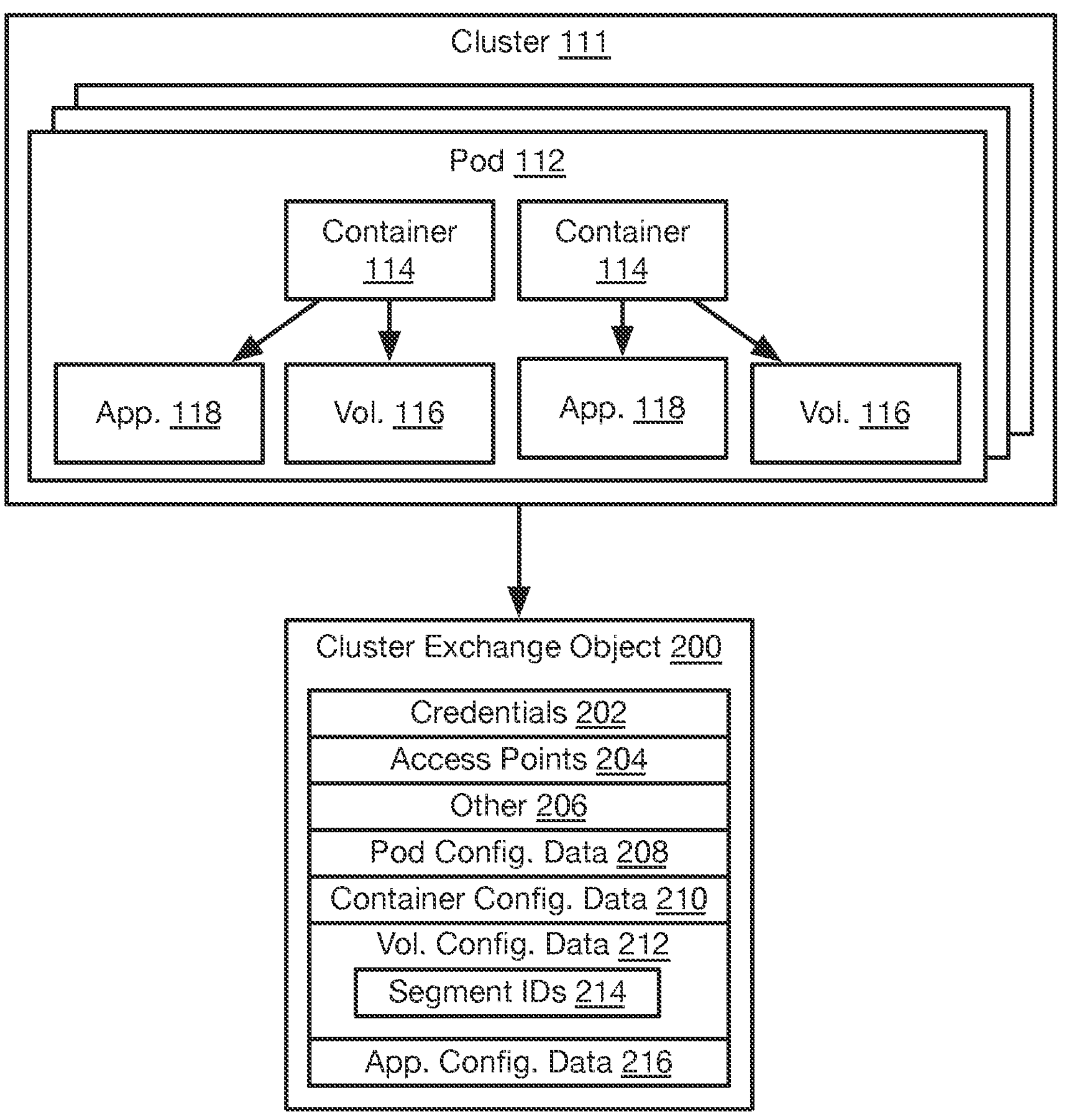
FIG. 2 is a schematic block diagram showing generation of a cluster exchange object in accordance with an embodiment.

Referring to FIG. 2, a cluster 111, and the constituent pods 112, containers 114, storage volumes 116, and application instances 118 of the cluster 111, may be represented as cluster exchange object 200. The cluster exchange object 200 represents a first cluster 111 executing on one or more first hosts. The cluster exchange object 200 includes sufficient information to recreate the cluster 111 on one or more second hosts that are different from the one or more first hosts. As used herein "host" may be understood as a server 102 or a unit of computing resources on the cloud computing platform.

The cluster exchange object 200 may be generated by the orchestrator 106, such as by the orchestrator 106 invoking a corresponding workflow from the workflow repository 120 by the workflow orchestrator 122. A worker 124 may therefore implement the workflow in order to create the cluster exchange object 200. The cluster exchange object 200 may be generated by the cluster 111 itself, e.g., by an agent of the orchestrator 106 executing in the cluster 111.

A cluster exchange object 200 may include credentials 202. The credentials 202 may include credentials for authenticating components of the cluster 111 with respect to another cluster 111, a third-party service, or other entity. The credentials may be in the form of passwords, tokens, public and private encryption keys, or other data for performing authentication. The cluster exchange object 200 may include access points 204. The components of a cluster may together implement a service that is accessible by an access point. For example, one of the components, e.g., one of the application instances 118, may implement a web server, server-side application configured to interact with a client-side application, or other type of application by which an entity may access the service provided by the cluster 111. The access point 204 may therefore include a uniform resource locator (URL), internet protocol (IP) address, port number, or other identifier that will be used by an entity to access the service provided by the cluster 111.

Other data 206 may also be included in the cluster exchange object 200, such as namespaces, internal network configuration data (addresses, protocols, gateway addresses, etc.), external network configuration data (destination address for the cluster 111 on an external network, gateway address of an external network etc.), environmental variables, or other configuration data.

The cluster exchange object 200 may further include configuration data for constituent components of the cluster 111. For example, the cluster exchange object 200 may include some or all of pod configuration data 208, container configuration data 210, storage volume configuration data 212 (including segment identifiers 214), and application configuration data 216. Some or all of the pod configuration data 208, container configuration data 210, storage volume configuration data 212 (including segment identifiers 214), and application configuration data 216 may be obtained from a manifest ingested by the orchestrator 106 and which defined the instantiation of the pods 112, containers 114, storage volumes 116, and application instances 118 of the cluster 111, respectively.

The pod configuration data 208 may include, for each pod 112 of the cluster 111, such information as an identifier of the pod 112, namespaces of the pod 112, environmental variables of the pod 112, network interface definitions for the pod 112 (IP addresses, virtual local area network (VLAN) identifiers and routing functions), identifiers of containers 114, application instances 118, and/or storage volumes 116 of the pod 112, and other configuration data of the pod 112. The pod configuration data 208 may omit an executable image of the pod 112, e.g., of a Kubelet implementing the pod 112, since the executable image may be retrieved from the image store 126 and configured using the pod configuration data 208 to recreate the pod 112.

The container configuration data 208 may include, for each container 114 of the cluster 111, such information as an identifier of the container 114, an identifier of an application instance hosted by the container 114, an identifier of an executable image used to instantiate the container 114, environmental variables of the container 114, a network address of the container 114, one or more identifiers of storage volumes 116 mounted to the container 114, and other configuration data of the container 114 112. The container configuration data 210 may omit the executable image of the container 14 since the executable image may be retrieved from the image store 126 and configured using the container configuration data 210 to recreate the container 114.

The storage volume configuration data 212 may include, for each storage volume 116 of the cluster 111, such information as an identifier of the storage volume 116, data storage information (encryption algorithm, compression algorithm, error correction codes, etc.), a size of the storage volume 116, amount of storage currently used by the storage volume 116, segment identifiers 214 of segments of storage currently allocated to the storage volume 116, or other data describing the storage volume 116. The storage volume configuration data 212 may omit the data stored in the segments of storage currently allocated to the storage volume 116. As described below, these segments of storage may be migrated to one or more destination hosts after the cluster exchange object 200 is transferred to the one or more destination hosts.

The application configuration data 216 may include, for each application instance 118 of the cluster 111, such information as an identifier of the application instance 118, an identifier of an executable image used to instantiate the application instance 118, environmental variables of the application instance 118, a network address of the application instance, identifiers of other application instances 118 having sessions with the application instance 118, or other configuration data. The application configuration data 216 may omit the executable image used to instantiate the application instance 118 since the executable image may be retrieved from the image store 126 and configured using the application configuration data 216 to recreate the application instance 118.

Figure 3:
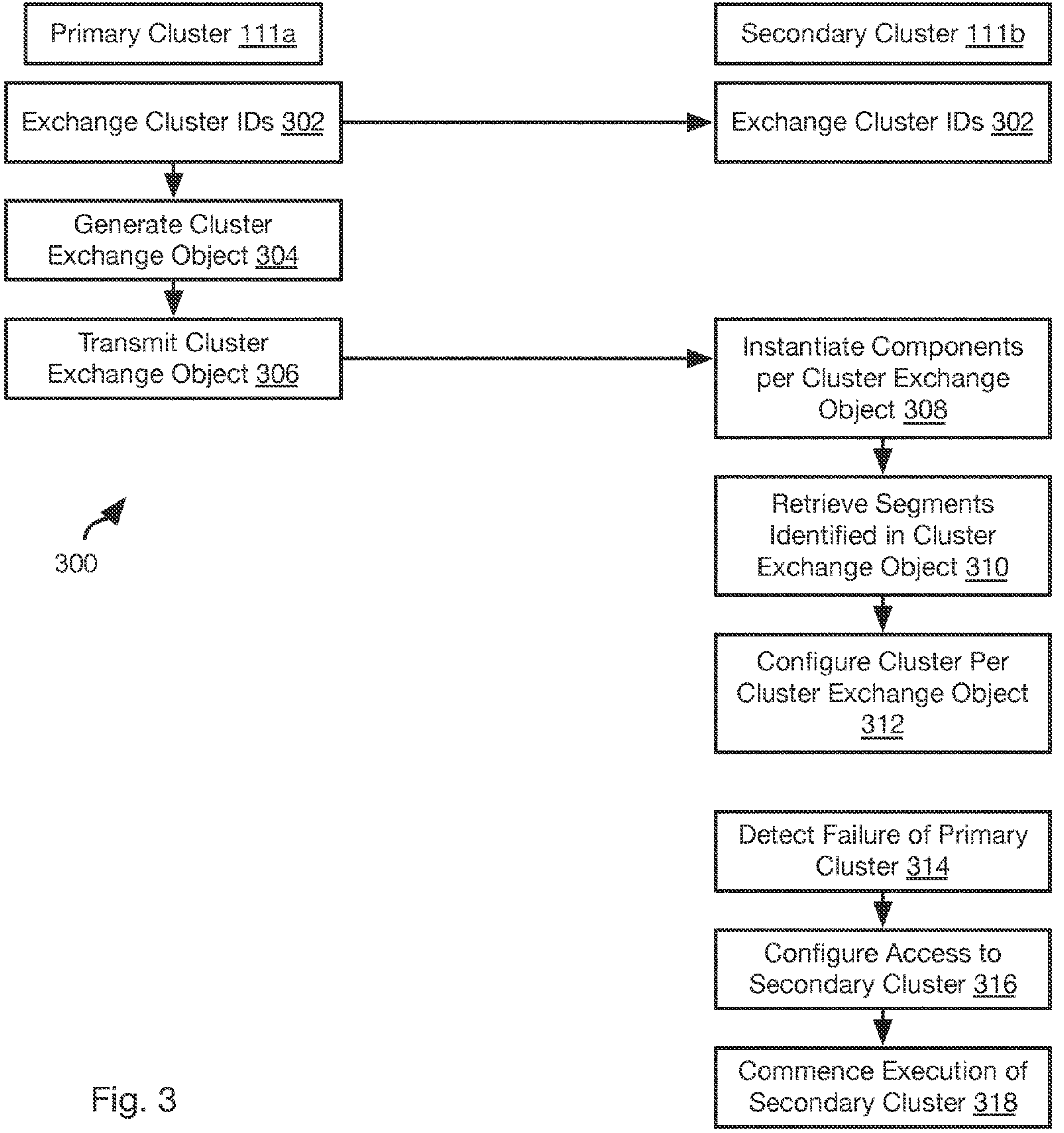
FIG. 3 is a process flow diagram of a method for replicating a cluster in accordance with an embodiment.

FIG. 3 illustrates a method 300 for using a cluster exchange object 200. The method 300 is performed by a primary cluster 111*a* and a secondary cluster 111*b* that becomes a replica of the primary cluster 111*a*. Actions described herein as being performed by a particular cluster 111*a*, 111*b* may be performed by a KUBERNETES master implementing the cluster 111*a*, 111*b*, an agent of the orchestrator 106 executing on the one or more hosts hosting the cluster 111*a*, 111*b*, or some other component.

The method 300 includes a primary cluster 111*a* exchanging 302 cluster identifiers with a secondary cluster 111*b*. The cluster identifiers of the primary cluster 111*a* and secondary cluster 111*b* may be used by the clusters 111*a*, 111*b* to communicate with one another. The exchange 302 of cluster identifiers may also be part of a process by which the primary cluster 111*a* acquires a secondary cluster 111*b* to provide redundancy with respect to the primary cluster 111*a*.

The primary cluster 111*a* generates 304 the cluster exchange object 200. As an alternative, the orchestrator 106 or a workflow may generate 304 the cluster exchange object 200 as described above. The primary cluster 111*a* transmits 306 the cluster exchange object 200 to the secondary cluster 111*b*.

The secondary cluster 111*b* may then recreate components of the primary cluster 111*a*. For example, the secondary cluster 111*b* may instantiate 308 components (pods 112, containers 114, storage volumes 116, application instances 118) referenced in the cluster exchange object 200. Instantiating a component may include assigning an identifier to the component and configuring the component as indicated in the configuration data 208, 210, 212, 216 for that component.

For each storage volume 116 reference in the cluster exchange object, a storage volume 116 is instantiated. The segments of storage belonging to that storage volume and referenced by the segment identifiers 214 may be retrieved 310. To avoid impacting performance of the primary cluster 111*a*, which may continue to perform production tasks during performance of the method 300, the segments of storage may be retrieves 310 gradually, such as in a low-priority process, until all of the segments of storage referenced by the segment identifiers 214 for each storage volume 116 are retrieved.

The method 300 may further include performing 312 one or more other configuration tasks, such as storing credentials 202 for use in authenticating components of the secondary cluster 111*b*, configuring an access point to the secondary cluster 111*b* according to the access point 204, and/or configuring namespaces, an internal network, one or more connections to an external network, configuring environmental variables, or performing other configuration tasks.

Following implementing steps 308-312 the secondary cluster 111*b* may be in various states. In one embodiment, the secondary cluster 111*b* is prepared to commence execution but the containers 114 and application instances 118 thereof remain suspended. In another embodiment, execution of the containers 114 and application instances 118 of the secondary clusters 111*b* is commenced but other clusters or third-party services are not configured to communicate with the secondary cluster 111*b* or otherwise use the secondary cluster 111*b* for performing production tasks. In whatever state, the secondary cluster 111*b* following implementing steps 308-312 preferably does not interfere with the primary cluster 111*a* performing production tasks.

The method 300 may include the secondary cluster 111*b* detecting 314 failure of the primary cluster 111*a*. Detecting 314 failure may include receiving a notification from the orchestrator 106 indicating failure of the primary cluster 111*a*. Detecting 314 failure may include failing to receive a heartbeat message from the primary cluster within a time window following a preceding heartbeat message. Detecting 314 failure may include failing to receive a response to a health check from the primary cluster 111*a*.

In response to detecting 314 failure of the primary cluster 111*a*, the secondary cluster may configure 316 itself, or be configured, for access by other clusters (other than the primary cluster 111*a*) or third-party entities. For example, where the containers 114 and application instances 118, execution of the containers 114 and application instances 118 may be initiated. The secondary cluster 111*b* or orchestrator 106 may configure a proxy to route traffic to the secondary cluster 111*b*. One or more other clusters 111 or third-party entities may receive an address of the secondary cluster 111*b* in association with the access point of the secondary cluster 111*b*.

The secondary cluster 111*b* may then commence 318 execution as the primary cluster and perform production tasks in response to requests from other clusters 111 or third-party entities.

Figure 4:
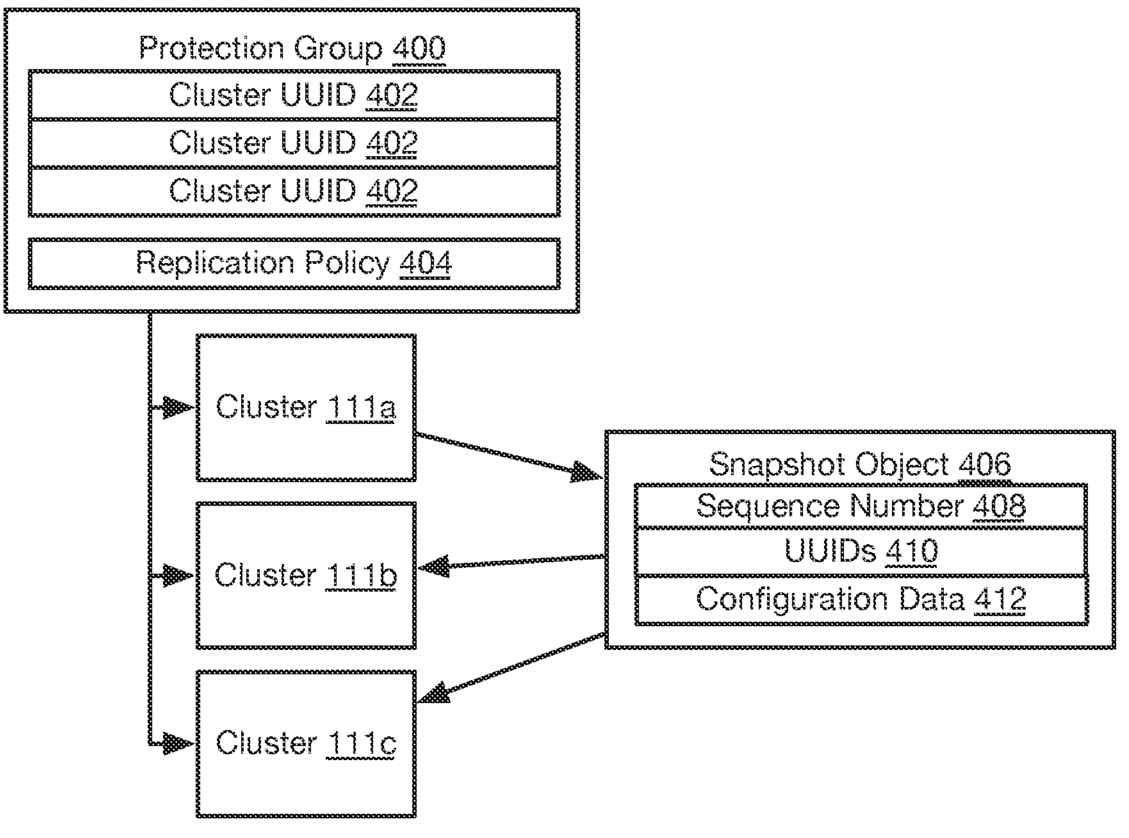
FIG. 4 is a schematic block diagram showing generation of a snapshot object in accordance with an embodiment.

Referring to FIG. 4, two or more clusters 111 may be organized into a protection group 400. The protection group 400 may be defined by a set of identifiers 402 of clusters 111*a*-111*c* belonging to the protection group 400. The identifiers 410 may be universally unique identifiers within a network environment including the hosts of the clusters 111 of the protection group 400. Clusters 111*a*-111*c* may be added to the protection group 400 as part of an automatic discovery process among the clusters 111*a*-111*c*, by the orchestrator 106, or a by manual grouping of the clusters 111*a*-111*c* into a protection group.

The protection group 400 may include a replication policy 404. The replication policy may specify the number of clusters in the protection group 400, how often snapshots are to be created of the primary cluster 111*a* of the protection group 400, how to select the new primary cluster 111*b*, 111*c* when the primary cluster 111*a* fails, or other data describing operation of the protection group 400.

A protection group 400 may be initialized according to the method 300 by which the data of the primary cluster 111*a* is replicated on the secondary clusters 111*b*. Alternatively, all of the clusters 111*a*-111*c* may be created effectively simultaneously such that transferring the state of the primary cluster 111*a* to the other clusters 111*b*, 111*c* is not performed.

Throughout operation of the protection group 400, which ever cluster is the primary cluster 111*a* will transmit snapshot objects 406 to the other clusters 111*b*, 111*c*. The frequency at which the snapshot objects 406 are transmitted may be defined in the replication policy 404. A snapshot object 406 may include a sequence number 408 that is unique to each snapshot object 406 such that the sequence number 408 of each snapshot object 406 is larger than the sequence number 408 of each previously-created snapshot object 406.

Each snapshot object may include a listing of identifiers 410 of components added to the primary cluster 111*a* since immediately preceding snapshot object 406 was created. The identifiers 410 may be UUIDs identifying some or all of pods 112, containers 114, storage volumes 116, application instances, and segments of storage added to the primary cluster 111*a*. The identifiers 410 may further indicate components or segments deleted since the previous snapshot object 406 was created. The snapshot object 406 may include configuration data 412 indicating changes to a configuration (e.g., any of the credentials 202, access points 204, or other configuration data 206) of the cluster since the previous snapshot object 406 was created.

Figure 5:
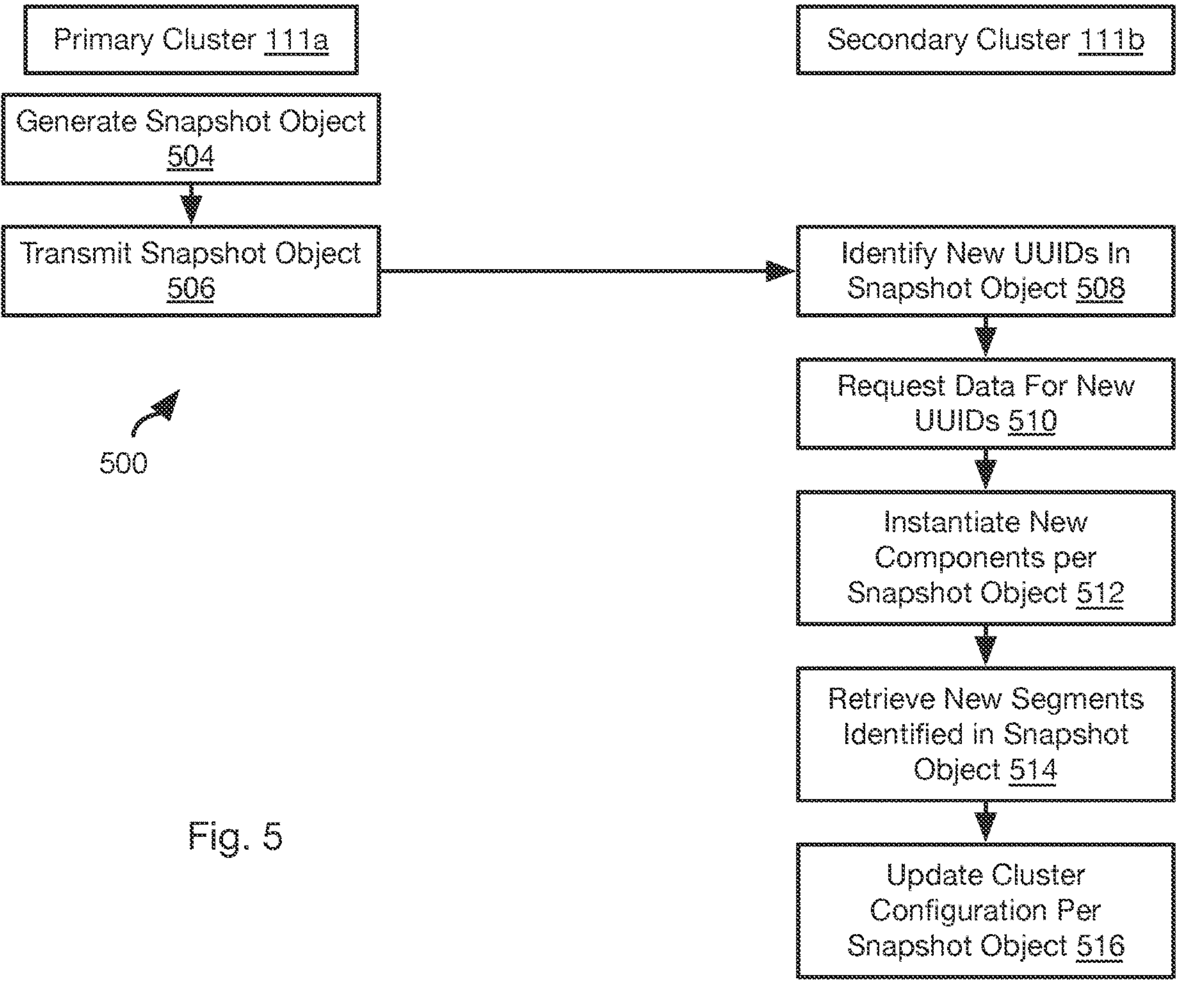
FIG. 5 is a schematic block diagram of a method for updating a secondary cluster using a snapshot object in accordance with an embodiment.

FIG. 5 illustrates a method 500 that may be performed by a primary cluster 111*a* with respect to each secondary cluster of any number of secondary clusters 111*b*, 111*c*. The primary cluster 111*a* generates 504 a snapshot object 406 and transmits 506 the snapshot object 406 to each of the secondary clusters 111*b*, 111*c* in the protection group 400. Each secondary cluster (hereinafter "secondary cluster 111*b*" for convenience) identifies 508 identifiers (e.g., UUIDs) 410 in the snapshot object 406 that do not belong to components and segments of storage currently on the secondary cluster 111*b* (hereinafter "new UUID"). For example, the secondary cluster 111*b* may maintain a list of the UUIDs for all components and segments on the cluster 111*b* ad may identify each UUID 410 of the snapshot object 406 that are not in the list.

The secondary cluster 111*b* may request 510 data for each new UUID. The snapshot object may include just a listing of UUIDs such that the secondary cluster 111*b* will request data for each UUID. For example, for a UUID corresponding to a component (pod 112, container 114, storage volume 116, application instance 118), the primary cluster 111*a* may return data sufficient to instantiate that component, such as some or all of the configuration data 208, 210, 212, 216 described above with respect to FIG. 2. The secondary cluster 111*b* may then instantiate 512 and configure each component referenced by the new UUIDs. For UUIDs corresponding to segments of storage, the secondary cluster 111*b* may retrieve 514 the segments of storage no already present on the secondary cluster 111*b*. Supplying of the data at step 510 and supplying the segments at step 514 may be performed by the primary cluster 111*a* at a rate selected to reduce impact on performance of production tasks by the primary cluster 111*a*. Supplying of the data at step 510 and supplying the segments at step 514 may be coordinated among multiple secondary clusters 111*b*, 111*c*. For example, the data and segments may be transferred to an intermediary and then downloaded from the intermediary by the plurality of secondary clusters 111*b*, 111*c* or downloaded to a secondary cluster 111*b* that then provides the data and segments to another secondary cluster 111*c*.

The method 500 may include performing one or more other actions to update 516 the configuration of the secondary cluster 111*b* according to the snapshot object 406. For example, where the snapshot object 406 lists deleted UUIDs, the component or segment corresponding to each deleted UUID may be removed from the secondary cluster 111*b*. Any other configuration change listed in the snapshot object 406 may also be implemented, which may include any of the configuration data described above with respect to the cluster exchange object 200 of FIG. 2.

The detection of failure of the primary cluster 111*a* and the commencement of a secondary cluster 111*b* to function as the primary cluster may be performed in the same manner as described above with respect to steps 314-318 of FIG. 3.

Figures 6, 7:
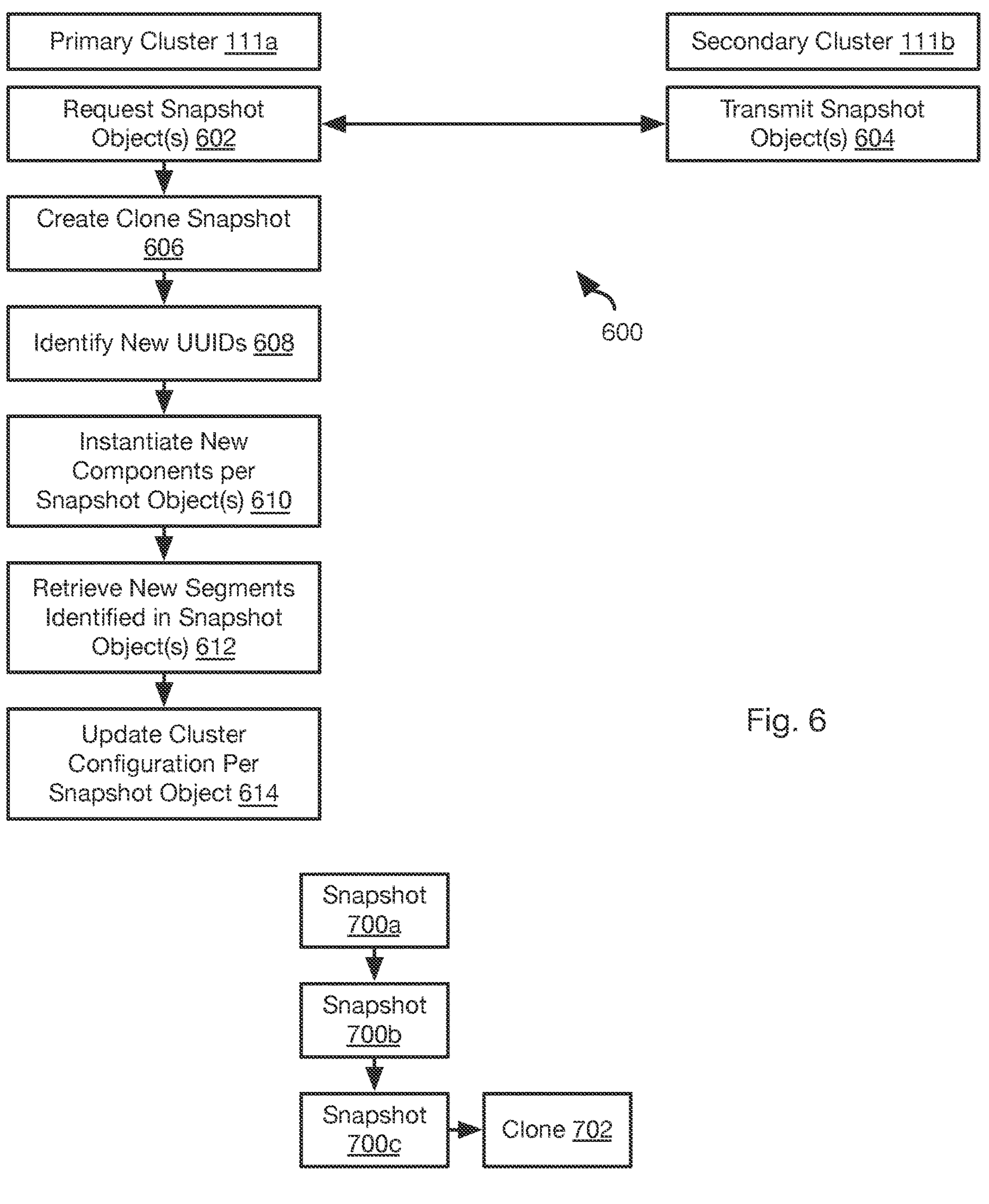
FIG. 6 is a process flow diagram of a method for restoring a primary cluster from a secondary cluster in accordance with an embodiment.
FIG. 7 is a schematic block diagram of a snapshot hierarchy in accordance with an embodiment.

FIG. 6 illustrates a method 600 for restoring a cluster (primary cluster 111*a* in the illustrated example) from a secondary cluster (secondary cluster 111*b* in the illustrated example). For example, the method 600 may be performed when one or more hosts implementing a primary cluster 111*a* are brought back online after a failure, being restarted, or some other event.

The primary cluster 111*a* requests 602 a snapshot object from the secondary cluster 111*b*. Where the primary cluster 111*a* has lost all data, the primary cluster 111*a* may request snapshot objects 406 corresponding to all sequence numbers 408 for the protection group 400 (e.g., a cluster exchange object 200). Where the primary cluster 111*a* has not lost all data, the primary cluster 111*a* may request a snapshot object for all sequence numbers 408 for which the primary cluster

111*a* does not have data. For example, when implementing the method 500 of FIG. 5, the primary cluster 111*a* may store a copy of each snapshot object 406 transmitted 506 to the secondary clusters 111*b*, 111*c*. The primary cluster 111*a* may therefore identify snapshot objects 406 for which data (e.g., components or segments identified by UUIDs 410) of the snapshot object 406 is missing in the primary cluster 111*a*. The primary cluster 111*a* may therefore transmit a request for all sequence numbers 408 of snapshot objects 406 having missing data. The primary cluster 111*a* may further request any snapshot objects 406 having sequence numbers higher than that of the snapshot object 406 with the highest sequence number on the primary cluster 111*a*

Before restoring data for snapshot objects 406 missing from the primary cluster 111*a* or for which the primary cluster 111*a* is missing data, the primary cluster 111*a* may create a clone snapshot 606. It may be that data on the primary cluster 111*a* was not transmitted to the secondary cluster 111*b* ("non-replicated data") prior to failure of the primary cluster 111*a*. Accordingly, a clone cluster may be created in order to preserve the non-replicated data for evaluation by a user. A clone cluster may be created as shown in FIG. 7. There may be any number of snapshots 700*a*-700*c* of a primary cluster 111*a* in a sequence. A clone snapshot 702 may include a snapshot object 406 including references to UUIDs of non-replicated data and referencing a snapshot object 406 of the last snapshot 700*c* that was successfully replicate on a secondary cluster 111*b*, 111*c* as described above with respect to FIG. 5. Accordingly, the clone snapshot 702 may be represented as a branch from a series of sequential non-clone snapshots 700*a*-702*c*.

The primary cluster 111*a* may identify 608 UUIDs ("new UUIDs") of components and/or segments in the snapshot objects 406 received from the secondary cluster 111*b* that do not correspond to components and/or segments currently on the primary cluster 111*a*. The primary cluster 111*a* may instantiate 610 new components for each new UUID corresponding to a component. Instantiating 610 the new components may be performed as described above with respect to step 512 of the method 500.

The primary cluster 111*a* may further retrieve 612 segments of storage referenced by the new UUIDs from the secondary cluster 111*b*, such as in the same manner as described above with respect to step 514 of the method 500.

The method 600 may include performing one or more other actions to update 614 the configuration of the primary cluster 111*a* according to one or more snapshot objects 406 received from the secondary cluster 111*b* at steps 602, 604. For example, where the snapshot object 406 lists deleted UUIDs, the component or segment corresponding to each deleted UUID may be removed from the secondary cluster 111*b*. Any other configuration change listed in the one or more snapshot objects 406 may also be implemented, which may include any of the configuration data described above with respect to the cluster exchange object 200 of FIG. 2.

Figure 8:
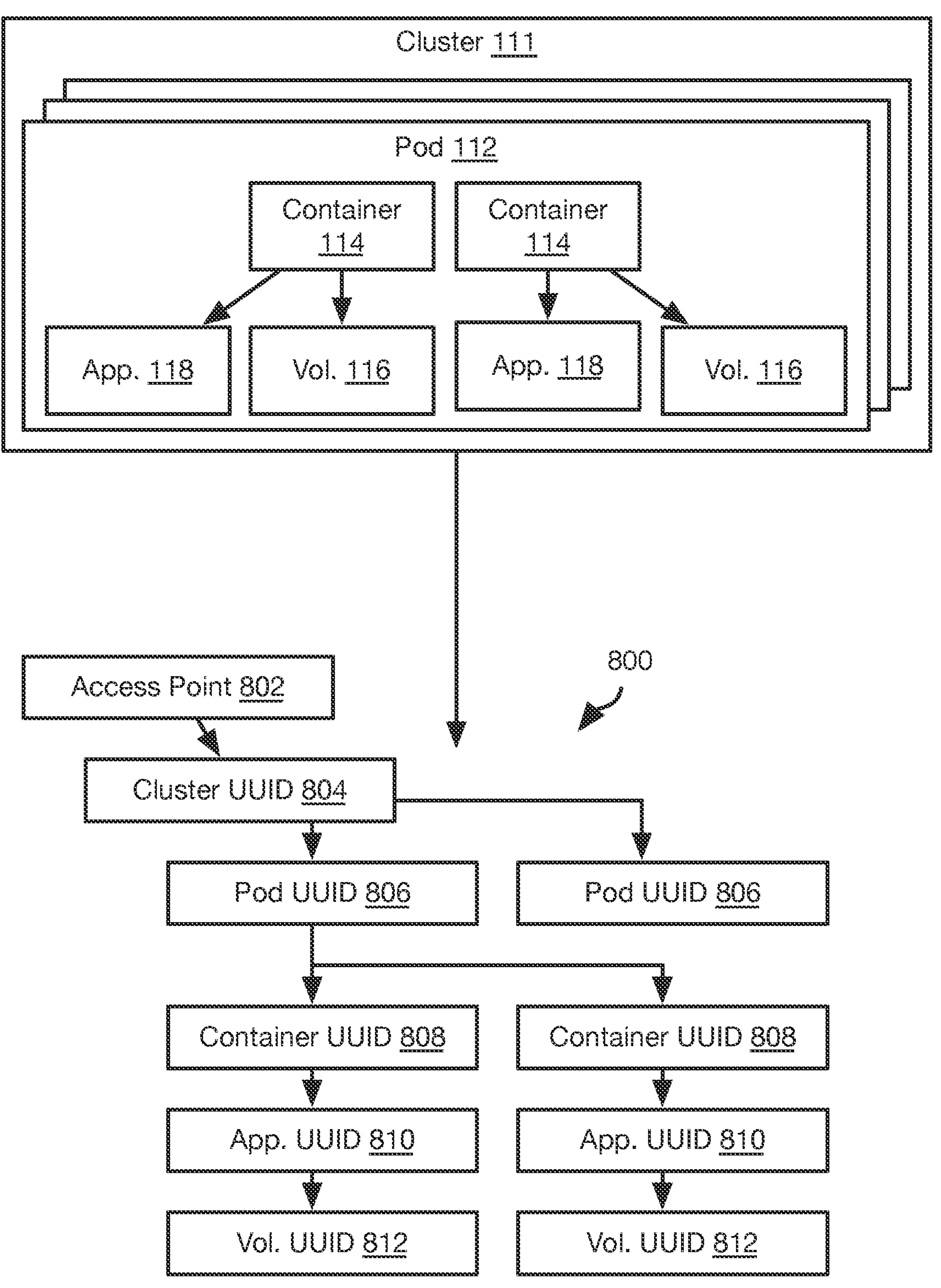
FIG. 8 is a schematic block diagram illustrating representation of a cluster as a file system in accordance with an embodiment.

Referring to FIG. 8, in some embodiments, a user may desire to investigate the configuration or status of a component (pod 112, container 114, storage volume 116, application instance 118) of a cluster 111. The cluster 111 may be represented as a directory structure 800. The representation of the cluster 111 as a directory structure 800 may be performed by the orchestrator 106, such as in response to a user request received through the orchestrator dashboard 108. A root folder 802 of the directory structure 800 may be labeled as an access point of the cluster 111. The access point label may be in the form of a URL, IP address, or some other identifier by which a service implemented by the cluster 111 is accessed. Another folder 804 may be labeled with the cluster UUID of the cluster 111. Other folders 806, 808, 810, 812 in the directory structure 800 may be labeled with the pod UUIDs, container UUIDs, application instance UUIDs, and storage volume UUIDs corresponding to the pods 112, containers 114, application instances 118, and storage volumes 116, respectively. A folder representing a component may be located within the folder of a component hosting the component or reflect some other logical relationship to facilitate access by a user. For example, a folder 804 labeled with the cluster UUID of a cluster 111 may be located within the folder 802. The folders 806 labeled with the pod UUIDs of pods 112 may be located within the folder 804 corresponding to the cluster 111 including the pods 112. The folder 808 labeled with the container UUID of a container 114 may be located within the folder 806 corresponding to the pod 112 including the container 114. The folders 810 labeled with the application instance UUID 810 of an application instance 118 may be located within the folder 808 corresponding to the container 114 hosting the application instance 118. Each storage volume 116 may be associated with a particular application instance 118 even if mounted to a container 114 or pod 112. Accordingly, a folder 812 labeled with the volume UUID of a storage volume 116 may be located within the folders 810 of the application instance 118 that uses the storage volume 116.

Each folder may be represented as an actual folder within a directory structure or the directory structure 800 may be a hierarchy that does not correspond to an actual file system. Each folder of the directory structure 800 may likewise be empty of any files or other data. Instead, data describing the component represented by a folder 802, 804, 806, 808, 810, 812 may be retrieved upon receiving a request for the contents of a folder 802, 804, 806, 808, 810, 812.

The composition of a cluster 111 may change as components are instantiated or de-instantiated in order to scale up or scale down based on usage. Accordingly, the directory structure 800 may also be generated on demand to reflect the current state of the cluster 111. For example, data sufficient to generate the directory structure 800 may be obtained from a cluster exchange object 200 or other object including some or all of the data described above as being included in a cluster exchange object 200.

Figures 9, 10:
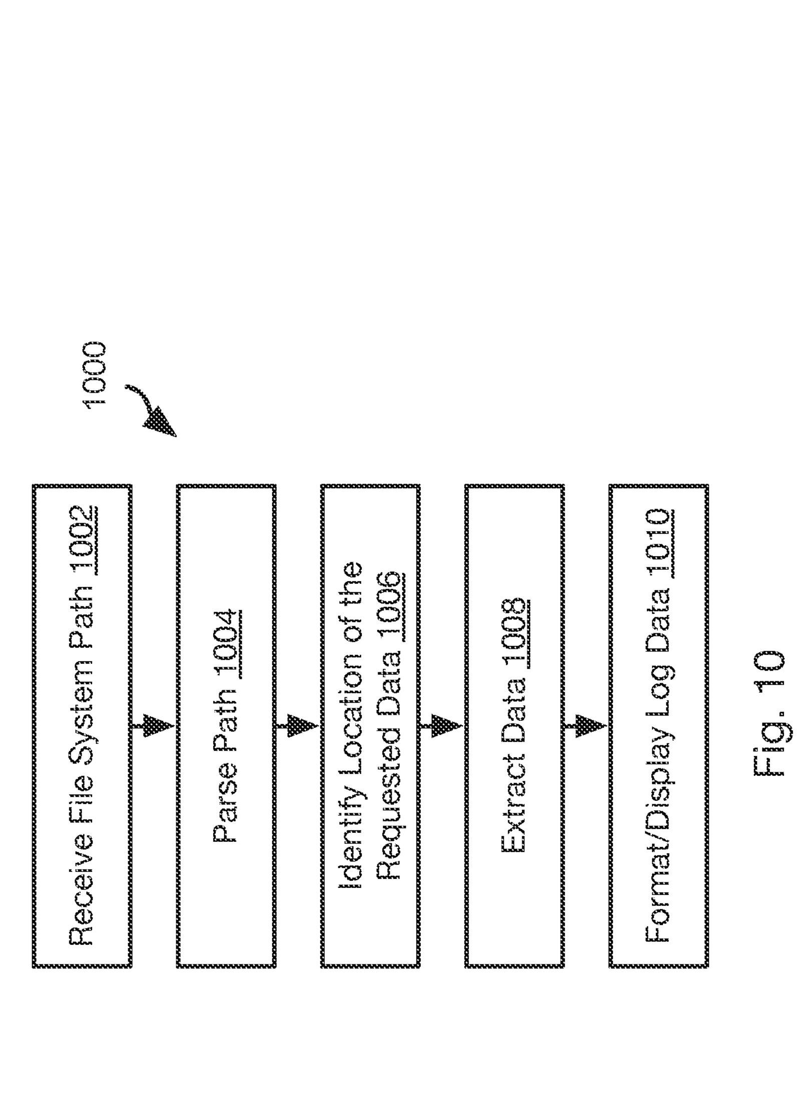
FIG. 9 is a path for reading data for an object in a cluster in accordance with an embodiment.
FIG. 10 is a process flow diagram of a method for interpreting a path to retrieve information regarding a cluster in accordance with an embodiment.

FIG. 9 illustrates an example path that may be submitted by a user in order to request data with respect to a particular component. For example, the path may be submitted through the orchestrator dashboard 108 directly or from a user device 110. For example, the path may be in the form of a path through the directory structure 800 and may include an access point identifier and some or all of a cluster identifier, an application identifier, and a volume identifier. For any particular, component, the path may reference a specific part, attribute, or other aspect of the component as a file name. In the illustrated example, the path name lists a snapshot identifier for a storage volume identifier thereby referencing only a portion of the storage volume corresponding to that snapshot identifier.

FIG. 10 illustrates a method 1000 for processing a path received 1002 from a user. The method 1000 may be executed by the orchestrator 106 or some other component. The method 1000 may include parsing 1004 the path to extract the UUIDs of each component or part (attribute, feature, constituent part, file, etc.) of a component. The method 1000 may further include identifying the location of the requested data, i.e., a host on which the last component or part of a component in the path is located. The location may be determined in various ways. In one approach, each host is queried with the path and the host that has the UUIDs in the path responds with the requested data. In another approach, the orchestrator 106 maintains a mapping of each UUID and the host thereof. For example, cluster exchange objects 200 may be collected and stored by the orchestrator 106 for each cluster 111 and may be mapped to the one or more hosts of each cluster. Step 1006 may be preceded by generating a current cluster exchange object for the cluster referenced in the path.

The method 1000 may include extracting 1008 the data referenced in the path. As noted above, the data may be extracted upon request and has not previously been stored in a directory corresponding to the directory structure 800. For example, extracting 1008 the data may include reading a log file for the last component in the path and identifying that portion of the log file. If the last identifier in the path represents a part of a component, that part of the log file that corresponds to that part of the last component of the path may be extracted 1008. Extracting 1008 data may include executing a workflow to perform a heath check or other diagnostic test of the last component in the workflow with the result of the workflow being returned as the extracted data.

The method 1000 may include formatting and displaying 1010 the data extracted at step 1008. For example, the data extracted at step 1008 may be formatted as a webpage, document, fields of a form, or other object that can be transmitted to and displayed by a user device. The method 1000 may further include transmitting a graphical representation of the directory structure 800 for navigation by a user in the same manner as a graphical user interface (GUI) in a windows-based operating system will provide a browser for navigating a file system having a directory structure. Such a representation of the directory structure 800 may include icons representing folders that may be selected to display the contents of the folders, which may include invoking the method 1000 to extract and display data for a component represented by a folder selected by a user.

Figure 11:
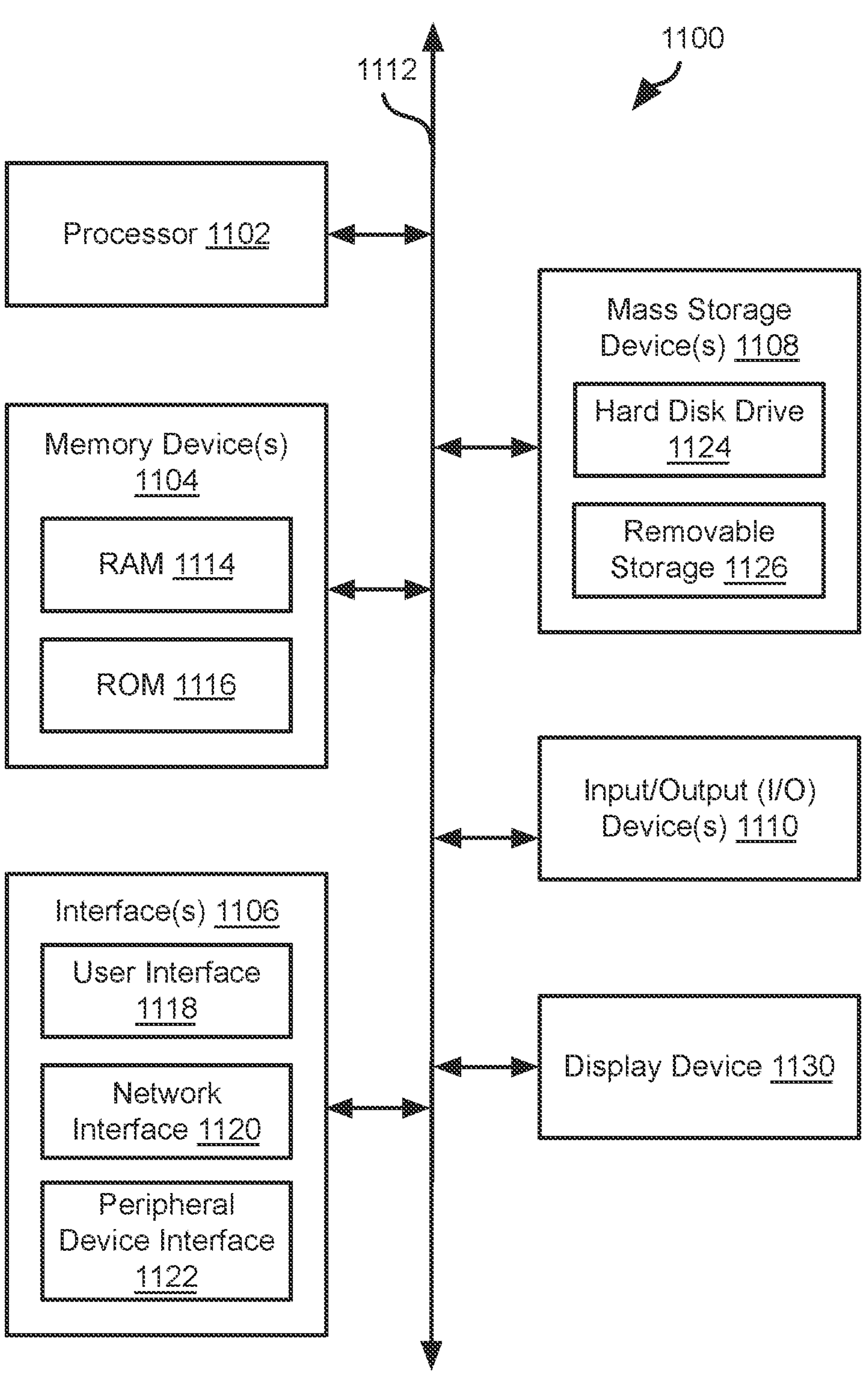
FIG. 11 is a schematic block diagram of an example computing device suitable for implementing methods in accordance with embodiments of the invention.

FIG. 11 is a block diagram illustrating an example computing device 1100. Computing device 1100 may be used to perform various procedures, such as those discussed herein. The servers 102, orchestrator 106, workflow orchestrator 122, and cloud computing platform 104 may each be implemented using one or more computing devices 1100. The orchestrator 106, and workflow orchestrator 122 may be implemented on different computing devices 1100 or a single computing device 1100 may implement both of the orchestrator 106 and workflow orchestrator 122.

Computing device 1100 includes one or more processor(s) 1102, one or more memory device(s) 1104, one or more interface(s) 1106, one or more mass storage device(s) 1108, one or more Input/output (I/O) device(s) 1110, and a display device 1130 all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable media 1126 and/or non-removable media.

I/O device(s) 1110 include various devices that allow data and/or other information to be input to or retrieved from computing device 1100. Example I/O device(s) 1110 include cursor control devices, keyboards, keypads, microphones, monitors or other display devices, speakers, printers, network interface cards, modems, lenses, CCDs or other image capture devices, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more peripheral interfaces such as interfaces for printers, pointing devices (mice, track pad, etc.), keyboards, and the like.

Bus 1112 allows processor(s) 1102, memory device(s) 1104, interface(s) 1106, mass storage device(s) 1108, I/O device(s) 1110, and display device 1130 to communicate with one another, as well as other devices or components coupled to bus 1112. Bus 1112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1100, and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:

a computer system including a plurality of processing devices and one or more memory devices operably coupled to the plurality of processing devices, the one or more memory devices storing executable code that, when executed by the plurality of processing devices, causes the plurality of processing devices to:

create, by a first cluster executing on the computer system, a snapshot object for the first cluster including one or more identifiers of one or more components that have changed in the first cluster, the one or more components being executable components executing in the first cluster;

transmit, by the first cluster, to a second cluster executing on the computer system, the snapshot object; and in response to the snapshot object, instantiate by the second cluster, copies of the one or more components on the second cluster such that the second cluster becomes a replica of the first cluster;

wherein the snapshot object is a second snapshot object having a second sequence number;

wherein the executable code, when executed by the plurality of processing devices, further causes the plurality of processing devices to restore the first cluster following failure of the first cluster by:

creating, by the first cluster, a clone snapshot object of the first cluster;

determining, by the first cluster, that data corresponding to a first snapshot object having a first sequence number lower than the second sequence number is present in the first cluster;

in response to determining that the data corresponding to the first snapshot object is present in the first cluster, transmitting, by the first cluster, the first sequence number to the second cluster;

in response to receiving the first sequence number, transmitting, by the second cluster, the second snapshot object to the first cluster;

receiving, by the first cluster, the second snapshot object from the second cluster; and instantiating, by the first cluster, the one or more components in the first cluster using the second snapshot object.

2. The apparatus of claim 1, wherein the executable code that, when executed by the plurality of processing devices, further causes the plurality of processing devices to:

add, by the first cluster, segment identifiers of one or more segments of data stored in a storage volume of the first cluster;

in response to the snapshot object, retrieve, by the second cluster, the one or more segments of data from the first cluster.

3. The apparatus of claim 1, wherein the one or more components include one or more logical hosts.

4. The apparatus of claim 1, wherein the one or more components include one or more application instances.

5. The apparatus of claim 1, wherein the one or more components include one or more storage volumes.

6. The apparatus of claim 1, wherein the second sequence number is greater than the first sequence number, the first snapshot object being created by the first cluster prior to creating the second snapshot object.

7. The apparatus of claim 1, wherein the executable code that, when executed by the plurality of processing devices, further causes the plurality of processing devices to restore the first cluster following failure of the first cluster by:

requesting, by the first cluster, the first snapshot object from the second cluster; and instantiating, by the first cluster, the one or more components in the first cluster using the first snapshot object.

8. The apparatus of claim 1, wherein the computer system comprises one or more first hosts and one or more second hosts, the first cluster executing on the one or more first hosts and the second cluster executing on the one or more second hosts.

9. The apparatus of claim 1, wherein the computer system is a cloud computing platform.

10. A method comprising:

creating, by a first cluster executing on a computer system, a snapshot object for the first cluster including one or more identifiers of one or more components that have changed in the first cluster, the one or more components being executable components executing in the first cluster;

transmitting, by the first cluster, to a second cluster executing on the computer system, the snapshot object; and in response to the snapshot object, instantiate by the second cluster, copies of the one or more components on the second cluster such that the second cluster becomes a replica of the first cluster;

wherein the snapshot object is a second snapshot object having a second sequence number, the method further comprising, following failure of the first cluster:

determining, by the first cluster, that data corresponding to a first snapshot object having a first sequence number that is lower than the second sequence number is present in the first cluster;

in response to determining that the data corresponding to the first snapshot object is present in the first cluster, transmitting, by the first cluster, the first sequence number to the second cluster;

in response to receiving the first sequence number, transmitting, by the second cluster, the second snapshot object to the first cluster;

receiving, by the first cluster, the second snapshot object from the second cluster; and instantiating, by the first cluster, the one or more components in the first cluster using the second snapshot object.

11. The method of claim 10, further comprising:

adding, by the first cluster, segment identifiers of one or more segments of data stored in a storage volume of the first cluster;

in response to the snapshot object, retrieve, by the second cluster, the one or more segments of data from the first cluster.

12. The method of claim 10, wherein the one or more components include one or more logical hosts.

13. The method of claim 10, wherein the one or more components include one or more application instances.

14. The method of claim 10, wherein the one or more components include one or more storage volumes.

15. The method of claim 10, wherein the second sequence number is greater than the first sequence number, the first snapshot object being created by the first cluster prior to creating the second snapshot object.

16. The method of claim 10, wherein the method further comprises, following failure of the first cluster:

requesting, by the first cluster, the first snapshot object from the second cluster; and instantiating, by the first cluster, the one or more components in the first cluster using the first snapshot object.

17. The method of claim 10, wherein the computer system comprises one or more first hosts and one or more second hosts, the first cluster executing on the one or more first hosts and the second cluster executing on the one or more second hosts.

18. The method of claim 10, wherein the computer system is a cloud computing platform.

* * * * *